US012751490B2

(12) United States Patent
Tersteeg et al.

(10) Patent No.: US 12,751,490 B2
(45) Date of Patent: Oct. 6, 2026

(54) NON-COMBUSTIBLE AEROSOL PROVISION DEVICE

(71) Applicant: Nicoventures Trading Limited, London (GB)

(72) Inventors: Pascal Tersteeg, CN Houten (NL); Arif Veendijk, CN Houten (NL)

(73) Assignee: Nicoventures Trading Limited, London (GB)

( * ) Notice: Subject to any disclaimer, the term of this patent is extended or adjusted under 35 U.S.C. 154(b) by 347 days.

(21) Appl. No.: 18/262,990

(22) PCT Filed: Feb. 2, 2022

(86) PCT No.: PCT/EP2022/052468
§ 371 (c)(1),
(2) Date: Jul. 26, 2023

(87) PCT Pub. No.: WO2022/167477
PCT Pub. Date: Aug. 11, 2022

(65) Prior Publication Data
US 2024/0081405 A1 Mar. 14, 2024

(30) Foreign Application Priority Data
Feb. 3, 2021 (GB) ...................................... 2101472

(51) Int. Cl.
*A24F 40/46* (2020.01)
*H05B 3/34* (2006.01)

(52) U.S. Cl.
CPC ............... *A24F 40/46* (2020.01); *H05B 3/34* (2013.01)

(58) Field of Classification Search
CPC ............ A24F 40/20; A24F 40/40; H05B 3/34
See application file for complete search history.

(56) References Cited

U.S. PATENT DOCUMENTS

2015/0013696 A1* 1/2015 Plojoux et al. ......... A24F 40/40 131/328
2017/0055580 A1 3/2017 Blandino et al.
(Continued)

FOREIGN PATENT DOCUMENTS

CN 206994432 U 2/2018
CN 108302112 A 7/2018
(Continued)

OTHER PUBLICATIONS

International Search Report and Written Opinion in International Appln. No. PCT/EP2022/052468, dated May 24, 2022, 15 pages.
(Continued)

*Primary Examiner* — Christopher M Rodd
*Assistant Examiner* — Ronnie Kirby Jordan
(74) *Attorney, Agent, or Firm* — MERCHANT & GOULD P.C.

(57) ABSTRACT

A non-combustible aerosol provision device (100) for generating aerosol from an aerosol generating material is disclosed. The non-combustible aerosol provision device (100) comprises a housing, a chamber (102) within the housing for receiving a consumable comprising the aerosol generating material and a resilient material (114) that surrounds at least a portion of the consumable when the consumable is received within the chamber (102), the resilient material (114) comprising a thickness that is adaptable in dependence upon a thickness of the consumable comprising the aerosol generating material, whereby consumables of different thicknesses are selectively snuggly receivable within the chamber (102).

14 Claims, 5 Drawing Sheets

(56) References Cited

U.S. PATENT DOCUMENTS

| | | | |
|---|---|---|---|
| 2018/0214645 | A1 | 8/2018 | Reevell |
| 2020/0054074 | A1 | 2/2020 | Xiaojun et al. |
| 2023/0172270 | A1 | 6/2023 | Hu et al. |

FOREIGN PATENT DOCUMENTS

| | | | |
|---|---|---|---|
| CN | 109998174 | A | 7/2019 |
| CN | 210137817 | U | 3/2020 |
| CN | 211910552 | U | 11/2020 |
| JP | 2014533513 | A | 12/2014 |
| JP | 2020505040 | A | 2/2020 |
| JP | 2020529842 | A | 10/2020 |
| KR | 20190011724 | | 2/2019 |
| WO | 2020074597 | A1 | 4/2020 |

OTHER PUBLICATIONS

Notice of Reasons for Rejection, Japanese Application No. 2023-545794, mailed Aug. 27, 2024, 6 pages.
Korean Notice to File a Response for Application No. 1020237025474, dated Aug. 13, 2025, 10 pages (5 pages English Translation, 5 pages Official).
First Office Action received for Chinese Patent Application No. 202280012158.3, mailed on Apr. 23, 2026, 20 pages (10 pages of English Translation and 10 pages of Official Copy).

* cited by examiner

NON-COMBUSTIBLE AEROSOL PROVISION DEVICE

RELATED APPLICATIONS

The present application is a National Phase Entry of PCT Application No. PCT/EP2022/052468, filed Feb. 2, 2022, which claims priority to GB Patent Application No. 2101472.5, filed Feb. 3, 2021, each of which is hereby incorporated by reference in their entirety.

TECHNICAL FIELD

The present invention relates to a non-combustible aerosol provision device.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

In accordance with a first aspect of some embodiments described herein, there is provided a non-combustible aerosol provision device for generating aerosol from an aerosol generating material, the non-combustible aerosol provision device comprising: a housing; a chamber within the housing for receiving a consumable comprising the aerosol generating material; a resilient material that surrounds at least a portion of the consumable when the consumable is received within the chamber, the resilient material comprising a thickness that is adaptable in dependence upon a thickness of the consumable, whereby consumables of different thicknesses are selectively snuggly receivable within the chamber.

The housing may be arranged to facilitate insertion of a consumable comprising the aerosol generating material into the chamber or removal of a consumable comprising the aerosol generating material from the chamber.

The housing may be arranged to open along a length of the chamber to facilitate insertion of a consumable comprising the aerosol generating material into the chamber or removal of a consumable comprising the aerosol generating material from the chamber.

The housing may further comprise an opening into the chamber to enable a consumable comprising the aerosol generating material to protrude from the housing when the consumable comprising the aerosol generating material is received in the chamber.

The resilient material may be a heat conductive material.

The resilient material may comprise a metallic wool.

The non-combustible aerosol provision device may further comprise: an aerosol generator system for, in use, generating aerosol from a consumable comprising the aerosol generating material when the consumable comprising the aerosol generating material is received in the chamber.

The aerosol generator system may comprise at least one heater for heating aerosol generating material in the consumable comprising the aerosol generating material when the consumable comprising the aerosol generating material is received in the chamber to generate the aerosol.

The at least one heater may comprise a layer of flexible heating foil.

The flexible heating foil may be metallic.

The chamber may comprise a tube disposed between the at least one heater and the resilient material.

The chamber may further comprise an annular stepped base comprising a first section that has a first width and a second section that has a second width smaller than the first width, wherein the first portion defines a distal end point of the chamber for a first type of consumable comprising the aerosol generating material and the second portion defines a distal end point of the chamber for a second type of consumable comprising the aerosol generating material, wherein the first type of consumable comprising the aerosol generating material is thicker than is the second type of consumable comprising the aerosol generating material.

The non-combustible aerosol provision device may further comprise a thin film layer on a surface of the resilient material, wherein, in use, the thin film layer contacts a consumable comprising the aerosol generating material when the consumable comprising the aerosol generating material is received in the chamber.

In accordance with a second aspect of some embodiments described herein, there is provided a non-combustible aerosol provision system comprising: a non-combustible aerosol provision device according to the first aspect; and at least one consumable comprising the aerosol-generating material for being received in the chamber.

Further features and advantages of the invention will become apparent from the following description of preferred embodiments of the invention, given by way of example only, which is made with reference to the accompanying drawings.

DETAILED DESCRIPTION

Figure 1:
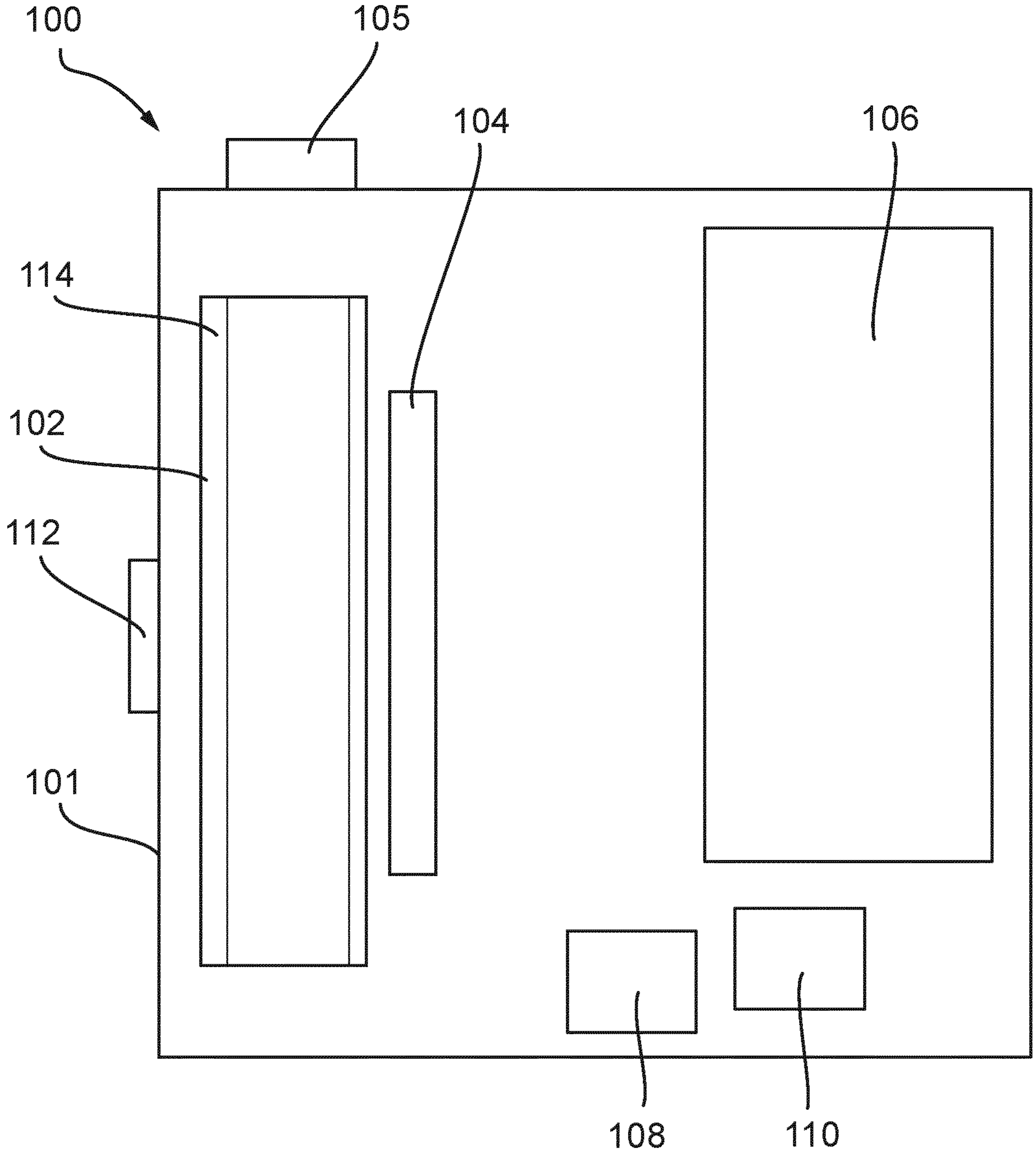
FIG. 1 shows a block schematic diagram of a non-combustible aerosol provision device for generating an aerosol from a consumable comprising an aerosol generating material.

FIG. 1 is a simplified schematic view of a non-combustible aerosol provision device 100. The non-combustible aerosol provision device 100 comprises a chamber 102 configured to receive a consumable (not shown in FIG. 1) which comprises aerosol generating material.

Aerosol-generating material is a material that is capable of generating aerosol, for example when heated, irradiated or energized in any other way. Aerosol-generating material may, for example, be in the form of a solid, liquid or gel which may or may not contain an active substance and/or flavorants. In some embodiments, the aerosol-generating material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol-generating material may for example comprise from about 50 wt %, 60 wt % or 70 wt % of amorphous solid, to about 90 wt %, 95 wt % or 100 wt % of amorphous solid.

The aerosol-generating material may comprise one or more active substances and/or flavors one or more aerosol-former materials, and optionally one or more other functional material.

An active substance may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical.

In some examples, the active substance comprises nicotine. In some embodiments, the active substance comprises caffeine, melatonin or vitamin B12.

The aerosol-former material may comprise one or more constituents capable of forming an aerosol. In some embodiments, the aerosol-former material may comprise one or more of glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate The one or more other functional materials may comprise one or more of pH regulators, colouring agents, preservatives, binders, fillers, stabilizers, and/or antioxidants.

The non-combustible aerosol provision device 100 is herein after referred to as the device 100. The device 100 comprises an aerosol generator 104 for causing aerosol to be generated from the aerosol generating material in a consumable received in the chamber 102.

An aerosol generator is an apparatus configured to cause aerosol to be generated from aerosol-generating material. In some embodiments, the or each aerosol generator is a heater configured to subject aerosol-generating material to heat energy, so as to release one or more volatiles from the aerosol-generating material to form an aerosol. In some embodiments, the or each aerosol generator is configured to cause an aerosol to be generated from the aerosol-generating material without heating. For example, the aerosol generator may be configured to subject the aerosol-generating material to one or more of vibration, increased pressure, or electrostatic energy.

Accordingly, in some examples, the aerosol generator comprises a heating arrangement configured to provide energy for heating the aerosol generating material of a consumable received in the chamber 102. In some examples, the heating arrangement comprises one or more resistive heating elements arranged in or in thermal contact with the chamber 102. The flow of current against the electrical resistance of the one or more resistive heating elements generates heat. This process is called Joule, ohmic, or resistive heating.

In some examples, the aerosol generator 104 is an induction heating arrangement and is configured to generate a varying magnetic field in order to inductively heat a susceptor. An induction heating arrangement may comprise one or more inductors through which an alternating current is passed to generate the varying magnetic field. In some examples, the aerosol generator 104 comprises one or more susceptors. In other examples, the aerosol generator 104 may not comprise a susceptor and one or more susceptors may instead be provided as part of/with consumables intended for use with the device 100.

A susceptor is a material that is heatable by penetration with a varying magnetic field, such as an alternating magnetic field. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor may be both electrically-conductive and magnetic, so that the susceptor is heatable by both heating mechanisms. A device that is configured to generate the varying magnetic field is referred to as a magnetic field generator, herein.

The device 100 comprises a power source 106. The power source 106 supplies electrical power to the various components of the device 100. In some examples, the power source 106 is a battery. In some examples, the power source 106 comprises a battery and a DC-DC converter, and power is supplied from the battery through the DC-DC converter. The DC-DC converter may allow the power supply 106 to supply power at a different voltage to the voltage of the battery. In some examples, the device 100 may comprise a DC to AC converter for converting a DC current from e.g. a battery to AC current, for example, to supply power to one or more inductors of the heating arrangement 104 where the heating arrangement 104 is an induction heating arrangement. In the following examples, the power source 106 is referred to simply as the battery 106.

In the example of FIG. 1, the device 100 comprises control circuitry 108 configured to control various aspects of the operation of the device 100 including the aerosol generator 104. In this example, the control circuitry 108 is a control processor 108 in data communication with a computer readable memory 110. The control circuitry 108 controls the various operations of the device, for example, by executing instructions stored on the computer readable memory 110. For example, the control circuitry 108 controls the delivery of electrical power from the battery 106 to the aerosol generator 104 by controlling various electrical component such as switches and the like (not shown in FIG. 1).

The device 100 comprises a housing 101 which forms an outer cover of the device 100 and surrounds and houses various components of the device 100.

The device 100 further comprises a user input device 112 which is electrically connected to the control circuitry 108 and by means of which a user can operate the device 100.

Examples of a suitable user input device 112 include one or more buttons, a track pad and a touch screen although any suitable device may be used.

The housing 101 may be openable to provide access to the interior of the housing 101 so a consumable can be placed into the chamber 102 ready for use and subsequently removed from the chamber 102 after use. In some examples, the housing 101 may be in two parts that are hinged together to enable the housing 101 to be opened and closed.

In this example, the device 100 also comprises an opening 105 at one end of the housing 101 which allows a consumable that is received in the chamber 102 to protrude from the device 100. The portion of the consumable received in the chamber 102 comprises the aerosol generating material from which the device 100 is configured to generate aerosol. The portion of the consumable which protrudes from the opening 105 may, for example, comprise a filter or the like, and the user may inhale the aerosol by drawing on the portion of the consumable which protrudes from the opening 105.

In alternative examples, the consumable is entirely received within the chamber 102 and the device 100 is provided with a mouthpiece (not shown) connected to the housing 101 and in fluid communication with the chamber 102 and on which a user draws to inhale the aerosol.

In this example, the chamber 102 contains a layer 114 of resilient material that surrounds at least a portion of a consumable (not shown) when the consumable is received within the chamber 102. The layer of resilient material 114 is arranged to conform to the thickness of the consumable to enable consumables of different thicknesses to be selectively snuggly received within the chamber 102.

It will be appreciated that the device 100 may comprise other components not shown in FIG. 1, such as ventilation inlets/outlet, a charging port, etc. It should be noted that FIG. 1 is merely a schematic sketch showing a number of components that may be included in the device 100. FIG. 1 is not intended to communicate particular positions of various components.

Referring now to FIGS. 2 to 4*b*, there is shown is a simplified view of a second example of a non-combustible aerosol provision device 200, referred to as the second device 200 hereinafter. The second device 200 may comprise any of the features of the device 100 which have been described above with reference to FIG. 1 and discussion of these features will not be repeated here. Like Figure references will be used to denote those features already described with reference to FIG. 1.

The second device 200 comprises a first end 220, referred to as a mouth or proximal end 220, and a second end 222 which is referred to as a distal end 222. Although not shown in FIGS. 2 to 4*b*, the second device 200 comprises a user input to allow a user to control the second device 200.

The second device 200 comprises a housing 101 which is configured to protect the internal components of the second device 200. In this example, the housing 101 is divided into two sections: a first section 216 and a second section 218. The first section 216 is connected to the second section 218 with a hinge mechanism 224 that extends longitudinally between the mouth end 220 and distal end 222. Accordingly, the housing 101 is arranged to open along a length extending between the mouth end 220 and distal end 222 to provide access to the chamber 102.

In this example, the first section 216 of the housing 101 contains a power source (not shown), a processor (not shown) and a memory (not shown) as described above with respect to the device 100 of FIG. 1.

The housing 101 comprises a plurality of panels including a first panel 226 and a second panel 228. In this example, one or more of the plurality of panels is removable from the housing 101 as a whole to give access to internal components for repairs or replacement. The one or more panels comprise any suitable material, for example, plastics material, including glass-filled nylon or metal. A plastic panel may be formed by injection moulding. Different ones of the plurality of panels may be made of different materials.

The first panel 226 of the second device 200 comprises an opening 230 at the mouth end 220 through which, in this example, a consumable (not shown) protrudes when received within the second device 200. This allows a user to place a mouth end of the consumable into the user's mouth in order to inhale aerosol released from the consumable when the second device 200 is in use.

Figure 2:
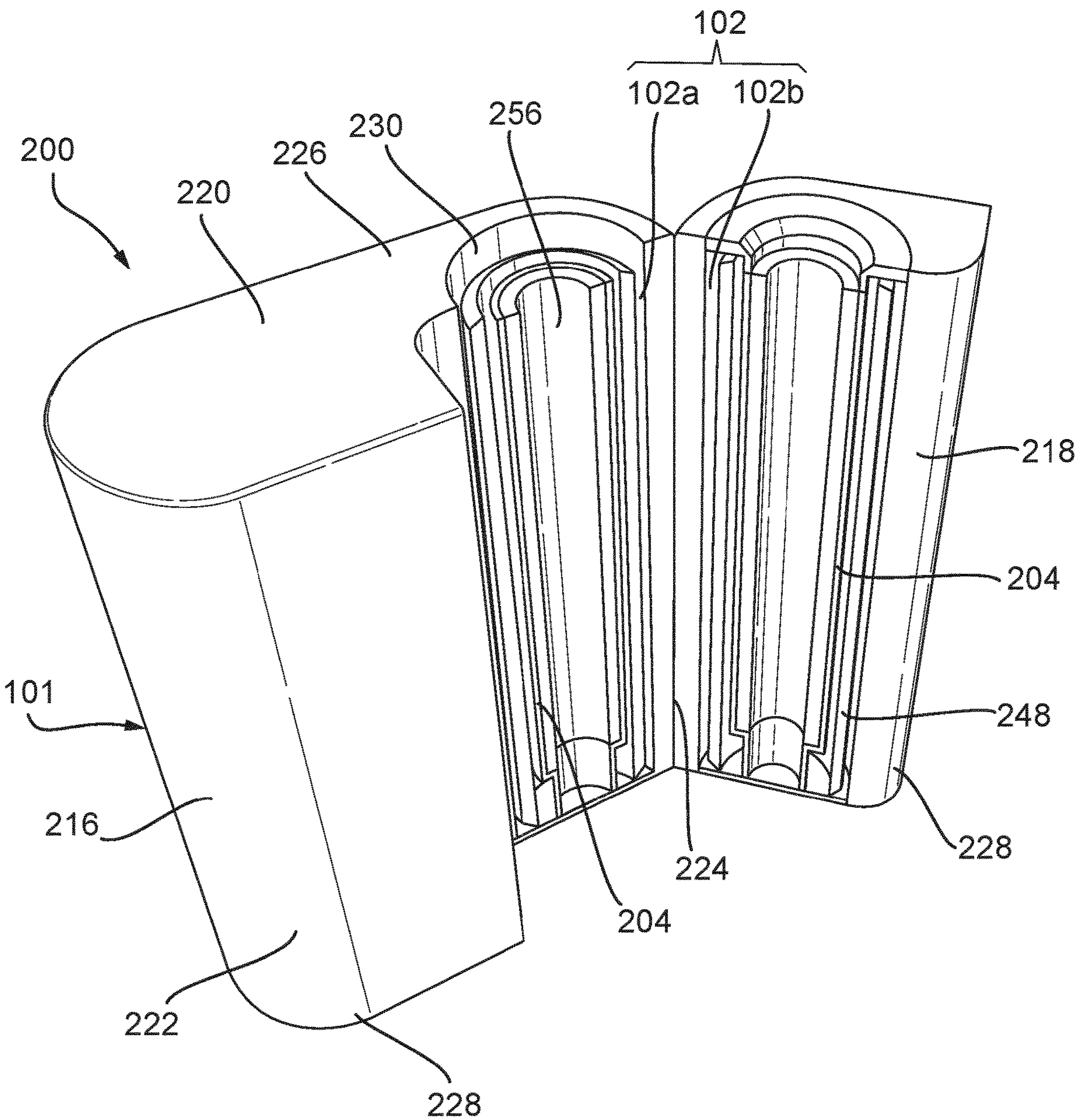
FIG. 2 shows a perspective schematic view of a second non-combustible aerosol provision device when in an open configuration.

As best shown in FIG. 2, in this example, the chamber 102 comprises a first chamber section 102*a* defined in the first section 216 of the housing 101 and a second chamber section 102*b* defined in the second section 218 of the housing 101. Each of the first chamber section 102*a* and the second chamber section 102*b* is in the form of an elongate channel having a semi-circular cross-section.

When the second device 200 is closed along the hinge 224, the first chamber section 102*a* and the second chamber 102*b* overlie one another along their lengths so that the chamber 102 as a whole is in the form of a hollow cylindrical tube.

Figure 3:
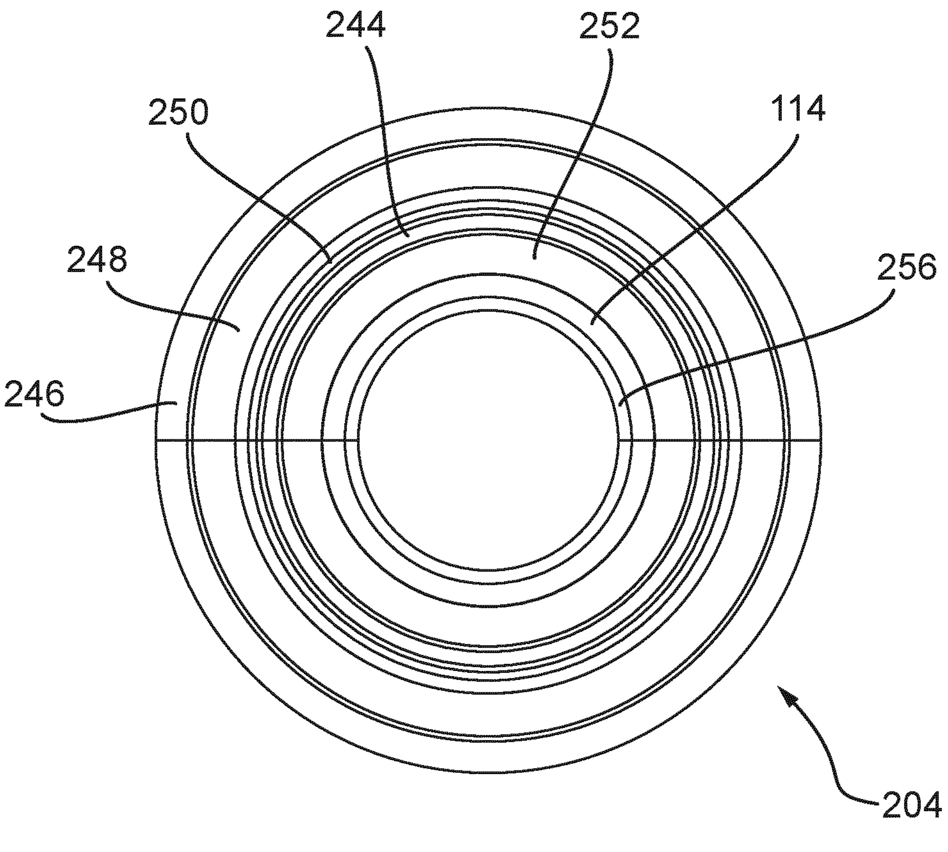
FIG. 3 shows a schematic diagram of a plan view cross section of a heating arrangement of the second non-combustible aerosol provision device.

The chamber 102 contains an aerosol generator, which in this example is a heating arrangement 204 which extends substantially along the axial length of the chamber 102. As is best illustrated in FIG. 3, when the second device 200 is closed, the heating arrangement 204 comprises a plurality of cylindrical co-axial layers that are arranged radially within the chamber 102. Each of the co-axial layers comprises a first semi-cylindrical layer that is arranged in the first chamber section 102*a* and a second semi-cylindrical layer that is arranged in the second chamber section 102*b*. As is best seen in FIG. 2, when the second device 200 is open along the hinge 224, the first semi-cylindrical layers are separated from the second semi-cylindrical layers which enables a user to insert a consumable into the chamber 102.

In sequence from the radially 'outermost' layer to the radially 'innermost' layer the plurality of layers comprises an outer sealing layer 246, a vacuum insulation tube 248, an inner sealing layer 250, a heating element 244, a support tube layer 252, a layer of resilient material 114 and a protective inner foil layer 256.

The vacuum insulation tube 248 is between the outer sealing layer 246 and the inner sealing layer 250 and provides a heat insulation layer to inhibit heat from flowing from the chamber 102 to the housing 101 or to other internal components of the second device 200. In this example, the vacuum insulation tube 248 comprises a metal tube (although non-metal materials are also possible), for example steel, comprising a radially outer wall and a radially inner wall that are connected to define a sealed volume of space that is at least partially evacuated of air to inhibit heat transfer through the vacuum insulation chamber 248.

The outer sealing layer 246 and the inner sealing layer 250 each comprises a layer of rubber or other suitable sealant material that acts to seal the chamber 102 to prevent aerosol leaking from the chamber 102 when the second device 200 is in use.

In this example, the heating element 244 comprises a layer of flexible heating foil, for example, metallic foil, supported on the support tube layer 252. The heating element 244 is electrically connected to the power supply and control processor of the second device 200 to enable the control processor to control the power supplied to the heating element 244 when the second device 200 is in use. Accordingly, in this example, the heating element 244 heats by means of resistive heating.

The support tube layer 252 comprises a heat conductive material, for example, the tube is a metal tube, for example a steel tube, so that heat generated by the heating element 244 readily transfers through the support tube layer 252.

As described above with reference to the device 100 illustrated in FIG. 1, the layer 114 of resilient material surrounds at least a portion of a consumable when the consumable is received within the chamber 102 and is arranged to conform to the thickness of the consumable.

In this example, the layer 114 of resilient material comprises a pad of fine, metallic, for example, steel, filaments. The layer 114 of resilient material may for example comprise the material commonly known as wire wool or wire sponge.

The layer 114 of resilient material is in thermal contact with the protective inner foil layer 256, which may be aluminium foil. The protective inner foil layer 256 has a smooth inner surface which is in contact with a consumable when the consumable is placed within the chamber 102. The protective inner foil layer 256 protects the consumable from being damaged by the layer 114 of resilient material and is easily cleanable.

A user inserts a consumable into the second device 200 by first opening the second device 200 via the hinge mechanism 224, placing the consumable firmly into the first chamber section 102*a* defined in the first section 216 of the housing 101 and then closing the second device 200 via the hinge mechanism 224 to press the second section 218 of the housing 101 onto the consumable.

As the second device 200 is closed, the layer 114 of resilient material is compressed and so conforms in shape around the consumable. This conforming of the layer 114 of resilient material around the aerosol generating article ensures that the aerosol generating article is snuggly retained in position and provides a good thermal pathway between the heating element 244 and the consumable. When the second device 200 is subsequently opened and the consumable is removed, the layer 114 of resilient material relaxes to the uncompressed thickness that it adopts when no consumable is inserted into the second device 200.

The layer 114 of resilient material enables the second device 200 to be compatible for use with different types of consumables, and in particular, different types of consumables that have different thicknesses, which a user can select to insert into the second device 200.

Figure 4A:
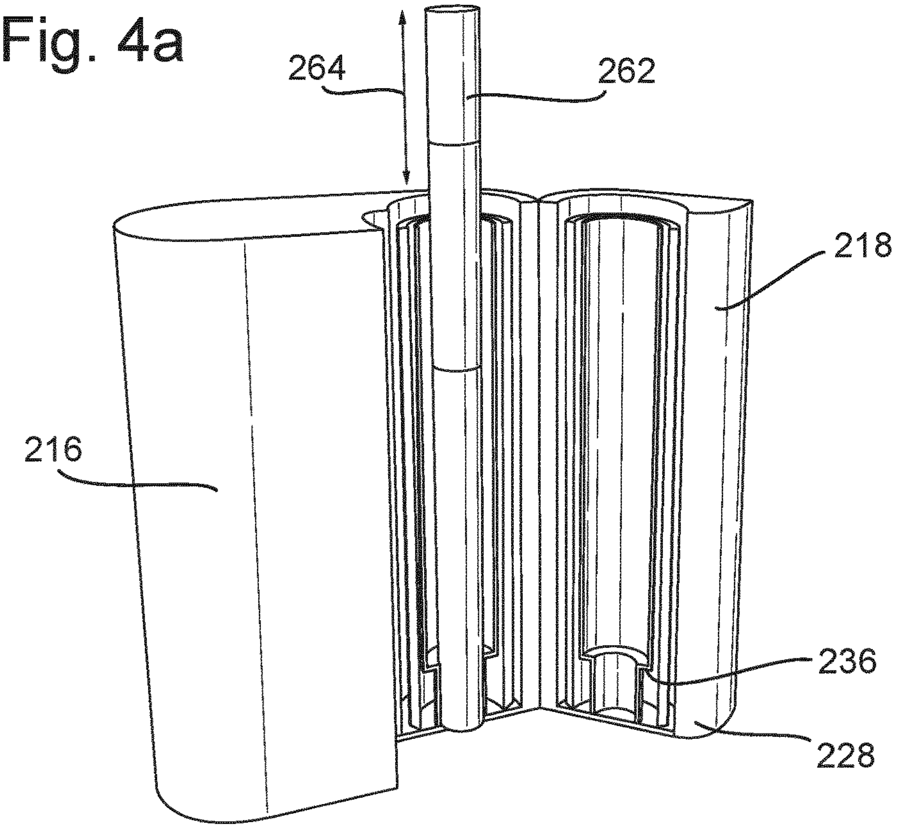
FIG. 4*a* shows a schematic perspective view of the second non-combustible aerosol provision device when in an open configuration and with a first type of consumable mounted therein.
Figure 4B:
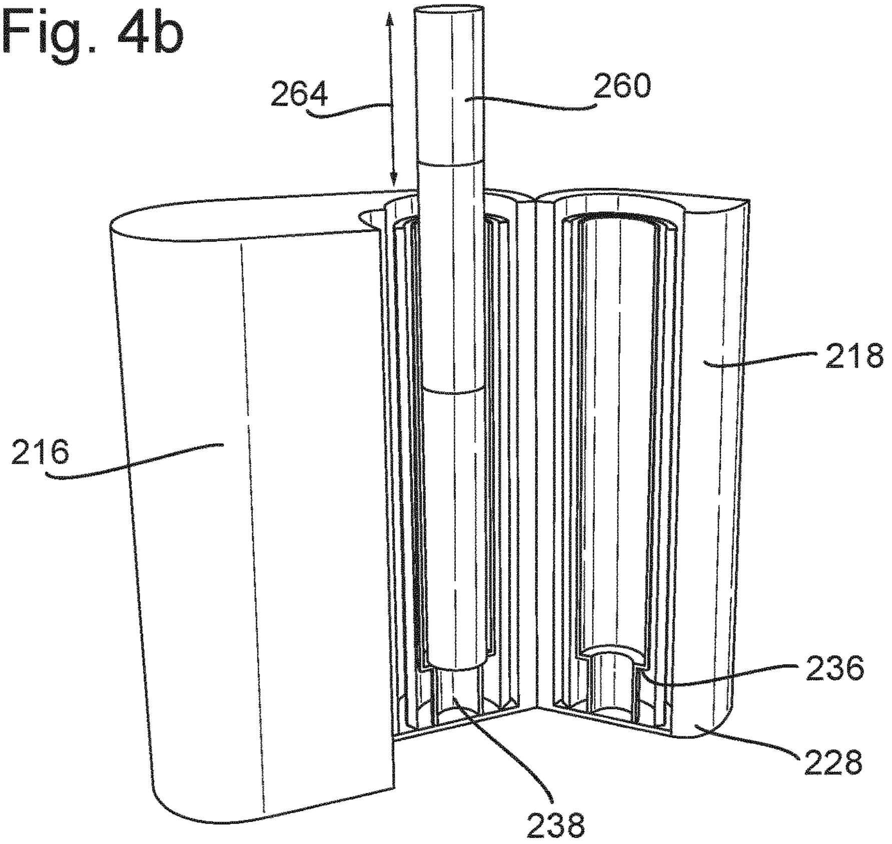
FIG. 4*b* shows a schematic perspective view of the second non-combustible aerosol provision when in the open configuration and with a second type of consumable mounted therein.
Figure 4C:
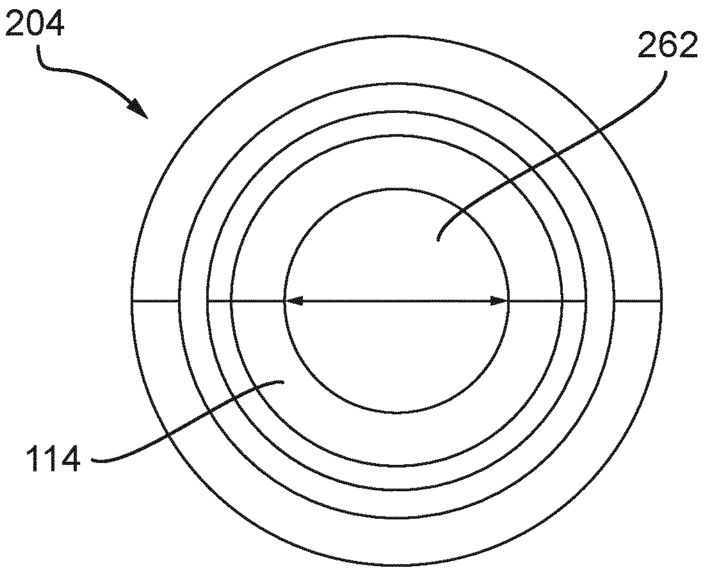
FIG. 4*c* shows a schematic a plan cross sectional view of the heating arrangement of the second non-combustible aerosol provision device with the first type of consumable mounted therein.
Figure 4D:
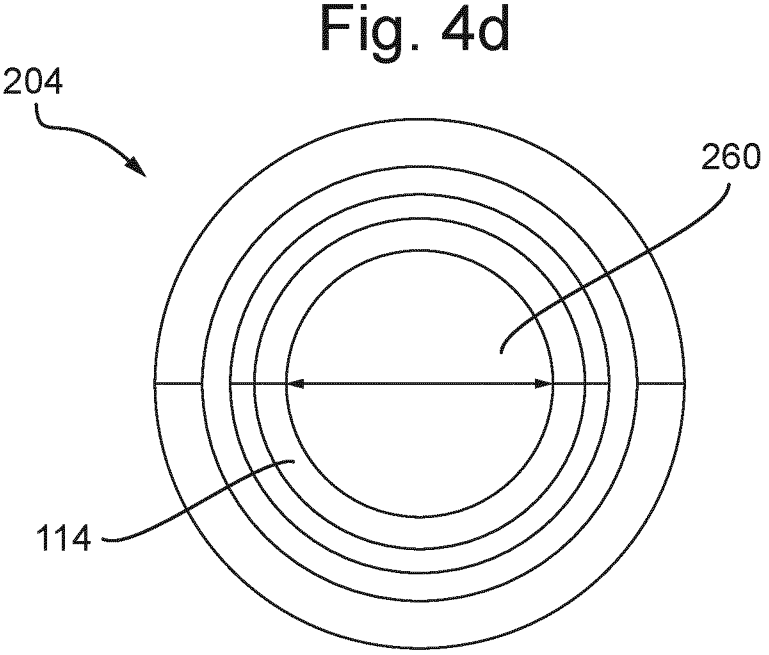
FIG. 4*d* shows a schematic plan cross sectional view of the heating arrangement of the second non-combustible aerosol provision device with the second type of consumable mounted therein.

This is illustrated in FIGS. 4*a* to 4*d*, in which FIGS. 4*a* and 4*c* illustrate a first type of consumable 262 inserted in the second device 200 and FIGS. 4*b* and 4*d* illustrate a second type of consumable 260 inserted in the second device 200. The first type of consumable 262 and the second type of consumable 260 are of different sizes. More specifically, in this example, the first type of consumable 262 is thinner than the second type of consumable (i.e. the first type of consumable 262 has a smaller width or diameter than does the second type of consumable). In this example, the first type of consumable is also longer than the second type of consumable.

As seen by comparing FIGS. 4*c* and 4*d*, the layer 114 of resilient material is radially compressed to a greater extent when the relatively thick second type of consumable 260 is inserted in the second device 200 (FIG. 4*d*) than it is when the relatively thin first consumable 262 is inserted in the second device 200 (FIG. 4*c*).

In this example, the chamber 102 further contains towards its distal end an annular step 236 that comprises a bore 238. The annular step 236, is, for example, defined by the outer sealing layer 246.

As is best illustrated in FIG. 4*b*, the width of bore 238 is smaller than the width of the second type of consumable 260. When the second type of consumable 260 is inserted in the second device 200, the distal end of the second type of consumable 260 abuts against an upper annular rim of the annular step 236.

As is best illustrated in FIG. 4*a*, the width of the bore 238 is slightly larger than the width of the first type of consumable 262. When the first type of consumable 262 is inserted in the second device 200, the distal end of the first type of consumable extends through bore 238 to abut against an inner surface of a panel of the housing 101.

The dimensions of the annular step 236 are selected such that, not with-standing the overall difference in lengths of the first type of consumable 262 and the second type of consumable 260, the extent 264 to which the mouth end or proximal end of each respective type of consumable extends out from the second device 200 is substantially the same.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A non-combustible aerosol provision device for generating aerosol from an aerosol generating material, the non-combustible aerosol provision device comprising:
- a housing;
- a chamber within the housing for receiving a consumable comprising the aerosol generating material;
- a resilient material that surrounds at least a portion of the consumable when the consumable is received within the chamber, the resilient material comprising a thickness that is adaptable in dependence upon a thickness of the consumable comprising the aerosol generating material, whereby consumables of different thicknesses are selectively snuggly receivable within the chamber.

2. The non-combustible aerosol provision device according to claim 1, wherein the housing is arranged to facilitate insertion of the consumable comprising the aerosol generating material into the chamber or removal of the consumable comprising the aerosol generating material from the chamber.

3. The non-combustible aerosol provision device according to claim 2, wherein the housing is arranged to open along a length of the chamber to facilitate insertion of the consumable comprising the aerosol generating material into the chamber or removal of the consumable comprising the aerosol generating material from the chamber.

4. The non-combustible aerosol provision device according to claim 1, wherein the housing further comprises an opening into the chamber to enable the consumable to protrude from the housing when the consumable comprising the aerosol generating material is received in the chamber.

5. The non-combustible aerosol provision device according to claim 1, wherein the resilient material is a heat conductive material.

6. The non-combustible aerosol provision device according to claim 5, wherein the resilient material comprises a metallic wool.

7. The non-combustible aerosol provision device according to claim 1, the non-combustible aerosol provision device further comprising:

an aerosol generator system for, in use, generating aerosol from the consumable comprising the aerosol generating material when the consumable comprising the aerosol generating material is received in the chamber.

8. The non-combustible aerosol provision device according to claim 7, wherein the aerosol generator system comprises at least one heater for heating the aerosol generating material in the consumable comprising the aerosol generating material when the consumable comprising the aerosol generating material is received in the chamber to generate the aerosol.

9. The non-combustible aerosol provision device according to claim 8, wherein the at least one heater comprises a layer of flexible heating foil.

10. The non-combustible aerosol provision device according to claim 9 wherein the layer of flexible heating foil is metallic.

11. The non-combustible aerosol provision device according to claim 8, wherein chamber further comprises a tube disposed between the at least one heater and the resilient material.

12. The non-combustible aerosol provision device according to claim 1, wherein the chamber further comprises an annular stepped base comprising a first section that has a first width and a second section that has a second width smaller than the first width, wherein the first section defines a distal end point of the chamber for a first type of consumable comprising the aerosol generating material and the second section defines a distal end point of the chamber for a second type of consumable comprising the aerosol generating material, wherein the first type of consumable comprising the aerosol generating material is thicker than is the second type of consumable comprising the aerosol generating material.

13. The non-combustible aerosol provision device according to claim 1, further comprising a thin film layer on a surface of the resilient material, wherein, in use, the thin film layer contacts the consumable comprising the aerosol generating material when the consumable comprising the aerosol generating material is received in the chamber.

14. A non-combustible aerosol provision system comprising:

the non-combustible aerosol provision device according to claim 1; and at least one consumable comprising the aerosol-generating material for being received in the chamber.

* * * * *